United States Patent

[11] 3,597,938

| [72] | Inventors | James S. Hellen<br>Wayne, N.J.;<br>John C. Stiles, Thousand Oaks, Calif. |
|---|---|---|
| [21] | Appl. No. | 826,556 |
| [22] | Filed | May 21, 1969 |
| [45] | Patented | Aug. 10, 1971 |
| [73] | Assignee | Singer-General Precision, Inc.<br>Little Falls, N.J. |

[54] FLEXURE JOINT
3 Claims, 9 Drawing Figs.

[52] U.S. Cl. .................................................. 64/15,
308/2 A
[51] Int. Cl. ...................................................... F16d 3/52
[50] Field of Search ................................................. 64/15;
308/2 A; 74/5

[56] References Cited
UNITED STATES PATENTS

| 2,903,867 | 9/1959 | Moody | 64/15 |
|---|---|---|---|
| 3,150,506 | 9/1964 | Alcaro | 64/15 |
| 3,390,546 | 7/1968 | Jewell | 64/15 |
| 3,384,424 | 5/1968 | Raines | 308/2 A |

*Primary Examiner*—Mark M. Newman
*Assistant Examiner*—Randall Heald
*Attorneys*—S. A. Giarratana, G. B. Oujevolk and S. M. Bender ABSTRACT: A flexure joint and a method of manufacturing same, in which one or more pairs of slots are formed through the wall of a unitary tubular member, the ends of one slot of each pair terminating a predetermined circumferential distance from the corresponding ends of the other slot of the same pair to form at least two flexure portions.

Patented Aug. 10, 1971 3,597,938

INVENTORS
JAMES S. HELLEN
JOHN C. STILES

BY

ATTORNEYS

Patented Aug. 10, 1971

INVENTORS
JAMES S. HELLEN
JOHN C. STILES

BY

ATTORNEYS

INVENTORS
JAMES S. HELLEN
JOHN C. STILES

BY

ATTORNEYS 3,597,938

1

FLEXURE JOINT

BACKGROUND OF THE INVENTION

This invention relates to a flexure joint, and, more particularly, to a one-piece flexible joint for connecting two members while permitting universal movement between them.

The need of providing a flexure joint to connect a driven member, such as a flywheel, or the like, to a drive shaft so that the former may be rotationally torqued by the latter and yet be essentially free of spring restraint over a predetermined range of angular deflection between two members, has been recognized. For example, a flywheel assembly has been proposed in which a flywheel is connected to a drive shaft by means of a universal joint connection, so that the shaft may drive the flywheel, and yet may deflect angularly with respect to the flywheel, so that the flywheel becomes an effective gyroscope.

These type of joints usually consist of two separate two-axis flexures, one with four flexure hinges extending parallel to the longitudinal axis of the joint, and one with four flexure hinges extending perpendicular to the longitudinal axis. The two flexures are joined by cementing or welding while maintaining the flexure axes of one flexure coincidental with those of the other, thus producing an assembly having the requisite axial and torsional strength. However, the necessity of fabricating two separate parts and assembling them renders the joint considerably expensive to manufacture. Also, the difficulty in aligning the axes of the two flexures during assembly may cause the flexure spring rates to extend out of specified ranges, and may result in high flexure stresses, thus reducing the life of the flexure assembly. Also, the axial flexure is particularly susceptible to damage, and the assembly operation necessary to produce the complete flexure also exposes the separate flexures to possible damage.

SUMMARY OF THE INVENTION

It is therefore an object of the present invention to provide a universal-type flexure joint and a method of making same, which joint is of a unitary rugged construction and which can be manufactured easily and at a reduced cost.

Briefly summarized, the present invention relates to a flexure joint, and a method of manufacturing same, in which one or more pairs of slots are formed through the wall of a unitary tubular member, the ends of one slot of each pair terminating a predetermined circumferential distance from the corresponding ends of the other slot of the same pair to form at least two flexure portions. The slots of one pair are axially spaced from the slots of the other pair, and each of the slots of each pair overlaps the flexure portion formed by the slots of the adjacent axially spaced pair.

BRIEF DESCRIPTION OF THE DRAWINGS

Reference is now made to the accompanying drawings for a better understanding of the nature and objects of the flexure joint, and the method of the present invention, which drawings illustrate the best mode presently contemplated for carrying out the objects of the invention and its principles, and are not to be construed as restrictions or limitations on its scope. In the drawings.

2

Figure 6:
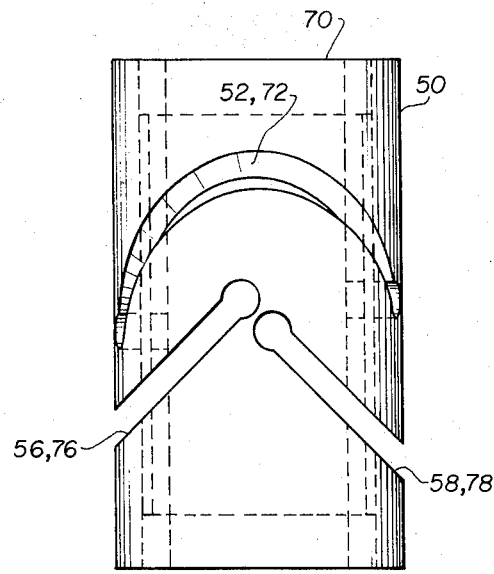
FIG. 6 is a front elevational view of still another embodiment of the present invention.
Figure 7:
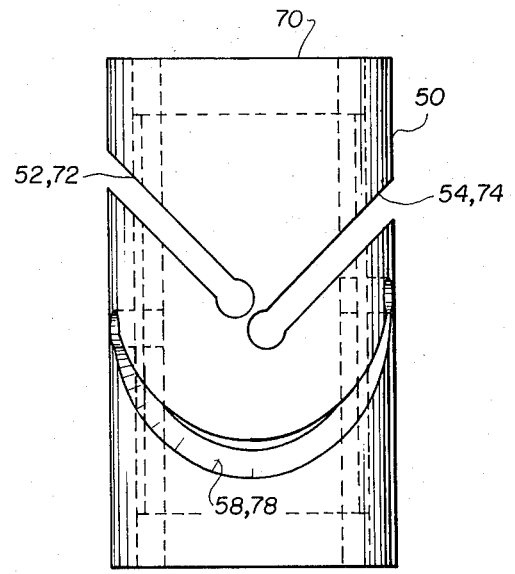
FIG. 7 is a side elevational view of the embodiment of FIG. 6.
Figure 8:
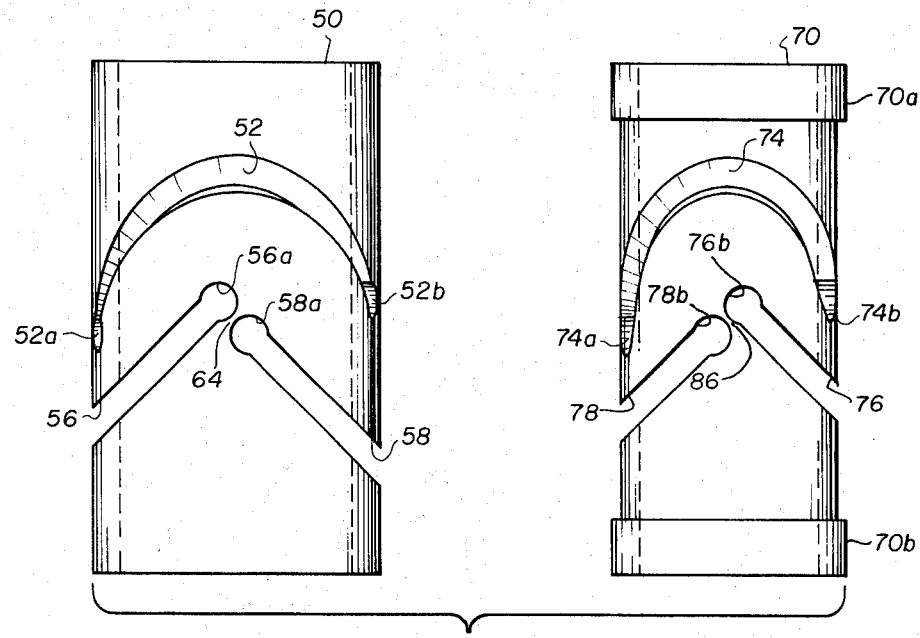
Figure 9:
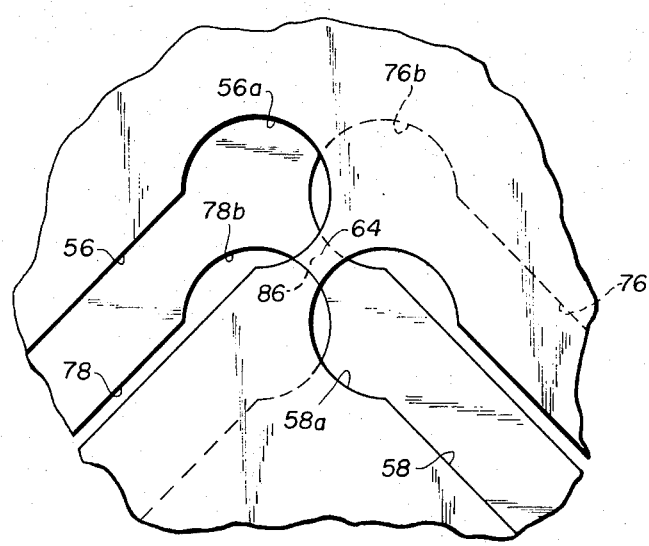

FIG. 8 is a front elevational view of the separate tubes of the embodiment of FIGS. 6 and 7; and FIG. 9 is an enlarged, partial, elevational view of the embodiment of FIGS. 6—8.

DESCRIPTION OF THE PREFERRED EMBODIMENTS

Figure 1:
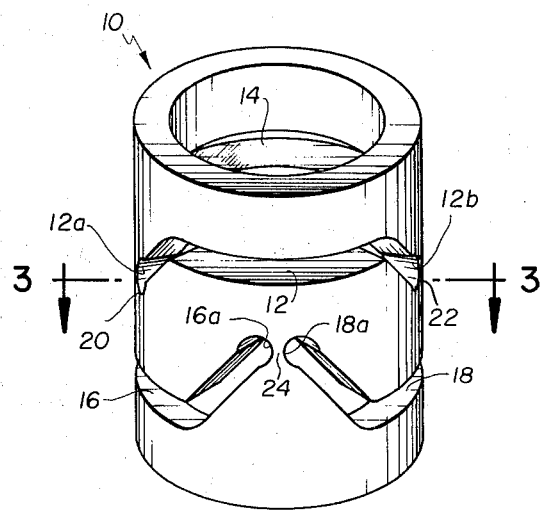
FIG. 1 is a perspective view of one embodiment of the flexure joint of the present invention.
Figure 2:
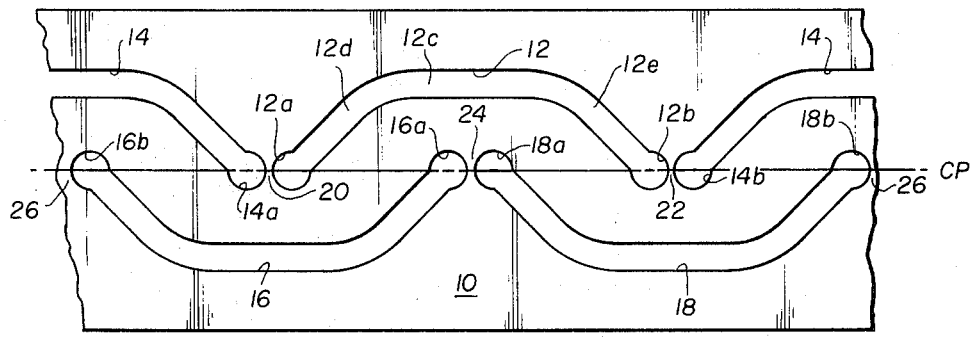
FIG. 2 is an unwrapped view of the flexure joint of FIG. 1.
Figure 3:
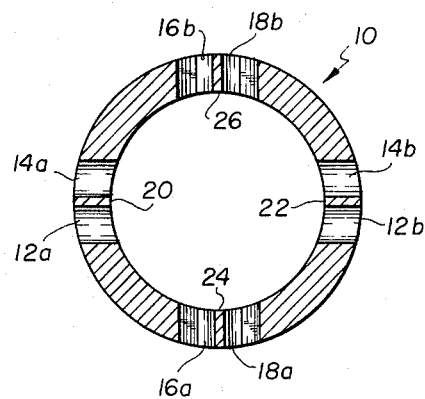
FIG. 3 is a cross-sectional view taken along line 3—3 of FIG. 1.

Referring specifically to the embodiment of FIGS. 1—3, a flexure joint is shown which is formed by a tubular member 10 having a pair of slots 12 and 14 cut through the wall thereof and extending substantially around the circumference thereof. A second pair of slots 16 and 18 are similarly arranged and are axially spaced from the slots 12 and 14.

A bore is formed through the wall of the tubular member at each end of each of the slots, bores 12a and 12b being formed at the ends of the slot 12, bores 14a and 14b being formed at the ends of the slot 14, bores 16a and 16b being formed at the ends of the slot 16, and bores 18a and 18b being formed at the ends of the slot 18. These bores are of a slightly greater diameter than the widths of the slots, and are spaced apart a predetermined distance to form a flexure portion 20 extending between the bores 12a and 14a, a flexure portion 22 extending between the bores 12b and 14b, a flexure portion 24 extending between bores 16a and 18a, and a flexure portion 26 extending between the bores 16b and 18b. The bores formed at the ends of the slots 12 and 14 and at the ends of the lots 16 and 18, are respectively parallel, and are positioned so that the longitudinal axes of the flexure portions 20, 22, 24 and 26 extend parallel to the axis of the tube as shown in FIG. 1.

The flexure portions 20, 22, 24 and 26 are in quadrature, and the arrangement is such that the slot 12 or 14 overlaps the flexure portions formed by the slots 16 and 18, and visa versa. For example, the slot 12 overlaps the flexure portions 24 between the slots 16 and 18, as shown in FIG. 1.

As shown in FIG. 2, the slots are generally U-shaped with the ends of the slots and therefore, the bores, lying in a common plane. Again taking the slot 12 as an example, it is seen that its base portion 12c is axially spaced from a common plane designated by the line CP in FIG. 2, and its leg portions 12d and 12e extend at an angle to the base portion and terminate at their respective bores 12a and 12b, in the common plane. The other slots 14, 16 and 18 are shaped in the same manner with the base portions of slots 16 and 18 extending on the other side of the common plane and with all of the other bores 14a, 14b, 16a, 18a and 18b extending in this plane.

Therefore if the flexure joint shown in FIGS. 1—3 is connected in any known manner between a flywheel and a drive shaft, an effective gyroscope is formed upon rotation of the flywheel, due to the fact that the flexure joint permits the flywheel to be rotationally torqued by the drive shaft and yet be essentially free of spring restraints over a predetermined range of universal angular deflections permitted by the flexure portions 20, 22, 24 and 26.

Figure 4:
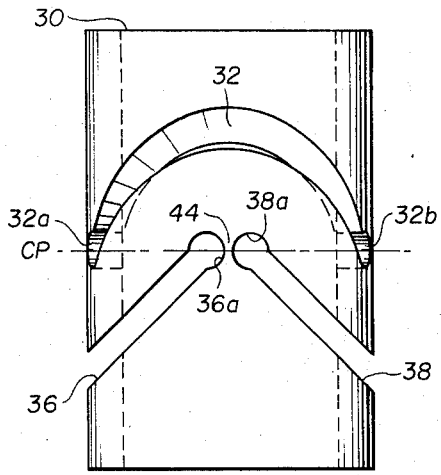
FIG. 4 is a front elevational view of another embodiment of the flexure joint of the present invention.
Figure 5:
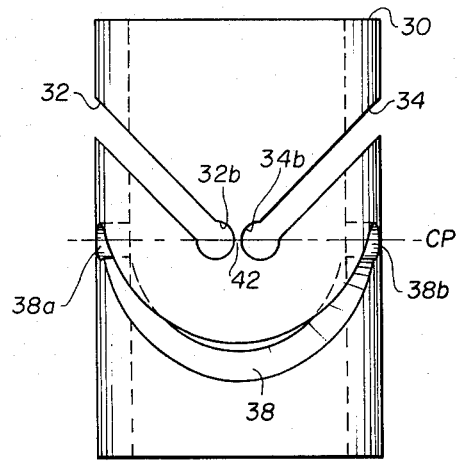
FIG. 5 is a side elevational view of the flexure joint of FIG. 4.

The flexure joint of FIGS. 4 and 5 is essentially the same as that of FIGS. 1—3 with the exception that straight cuts are made through the wall of a tubular member 30 to form the slots, Particularly, a first pair of slots 32 and 34 extend substantially around the tubular member 30 and are axially spaced from a similar pair of slots 36 and 38. Each slot extends at an acute angle with respect to a common plane CP in which the ends of the respective slots terminate, as is apparent from the drawings.

The slot 32 terminates in a pair of bores 32a and 32b and overlaps a flexure portion 44 formed between the bores 36a and 38a of the slots 36 and 38, respectively, with the longitudinal axis of the flexure portion 44 extending parallel to the axis of the tubular member 30, as shown in FIG. 4. Since the other slots, bores, and flexure portions are formed in a similar manner, as shown in FIGS. 4 and 5, they will not be described in any further detail. Thus, this embodiment retains the essential features of the previous embodiment while being easier to manufacture due to the use of the simple straight slots.

In the embodiments of FIGS. 6—9 a flexure joint is formed by a pair of telescoping tubular members 50 and 70, with the tubular member 70 having a slightly smaller diameter and extending within the tubular member 50. As shown in FIG. 8, flange portions 70a and 70b are formed adjacent each end of the tubular member 70 and engage the inner surface of the tubular member 50 to align the tubular members when they are positioned in their telescoping position.

According to this embodiment, straight slots are cut in the tubes while they are positioned in their telescoping position as shown in FIGS. 6 and 7, so that one cutting stroke produces two —one in each tube. Specifically, slots 52 and 72 are formed in the tubular members 50 and 70, respectively, with one cutting stroke. Similarly slots 54 and 74, slots 56 and 76, and slots 58 and 78 are formed in the respective tubular members with the same cutting stroke.

As shown in FIG. 8, each slot has a corresponding bore formed at each end, as in the previous embodiments, such as bores 52a and 52b of slot 52. Unlike the previous embodiments, however, the corresponding bores forming the flexure portions are axially offset with respect to each other to form an angularly extending flexure position. For example, the bores 56a and 58a form a flexure portion 64 which extends at an angle, such as 45°, with respect to the axis of the tubular member, this also being true with respect to the other flexure portions of both tubes.

After making the above bores and double cuts, and with the inner tubular member positioned within the outer tubular member, the inner member is rotated 180° to the position shown in the right hand portion of FIG. 8, and the tubular members are attached to one another at each end in any known manner. As a result the corresponding flexure portions of the tubular members will extend at 45° angles in all directions and at a 90° angle to each other as shown, for example, by the flexure portions 64 and 86 in FIG. 8. This renders the joint equally elastic in all orthogonal planes to the axis, which may be essential in extremely precise inertial devices.

Thus, the embodiment of FIGS. 6—9 incorporates the advantages of the previous embodiments, while adding no additional feature, with only a nominal increase in complexity and cost.

It is noted that in manufacture of the flexure joint of each of the embodiments discussed above, it is desirable to initially form the bores by means of high-precision boring, before cutting the slots connecting the bores. This is true due to the fact that the spacing between bores is more critical than the exact position of the slots.

It is emphasized that the flexure joint of the present invention is not limited to use in gyroscopes, but may be used in any environment in which a precise universal joint connection is required.

It can also be appreciated that changes in the above embodiments in regard to the number of slots and their relative positions, etc., can be made without departing from the scope of the present invention, and that other variations of the specific construction and arrangement of the flexure joints disclosed above as well as their method of manufacture, can be made by those skilled in the art without departing from the invention as defined in the appended claims.

We claim:

1. A flexure joint comprising two telescoped tubular members each having at least one pair of circumferentially extending U-shaped slots formed through the wall thereof, the ends of one slot of each pair terminating a predetermined circumferential distance from the corresponding ends of the other slot of the same pair, the portions of each of said tubular members between said corresponding ends being necked down to form at least two flexure portions, said flexure portions lying in a common plane extending transverse to the axes of said tubular members, wherein the flexure portions of each of said tubular members extend at an angle to the axes of said tubular members, and wherein the longitudinal axes of the flexure portions of one of said tubular members extend at right angles to the longitudinal axes of the flexure portions of the other of said tubular members.

2. The flexure joint of claim 1 wherein a bore is formed in the wall of said tubular member at each end of each of said slots, the adjacent bores being spaced a predetermined amount to form said necked down flexure portions.

3. The flexure joint of claim 1 wherein the combined arcuate lengths of the slots of each pair along with their corresponding flexure members extend for substantially one circumference of their respective tubular member.